United States Patent Office 3,431,124
Patented Mar. 4, 1969

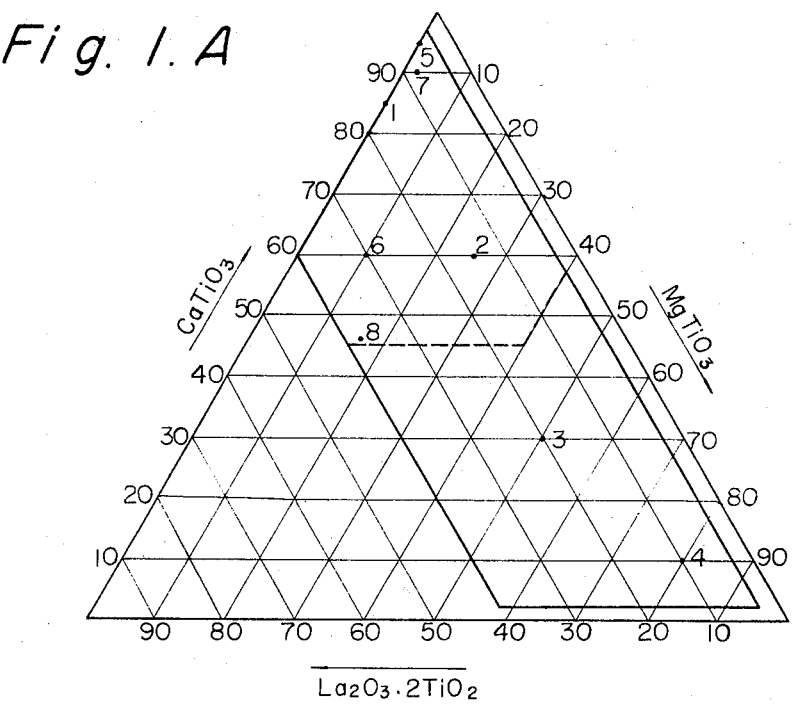
Fig. 1.A
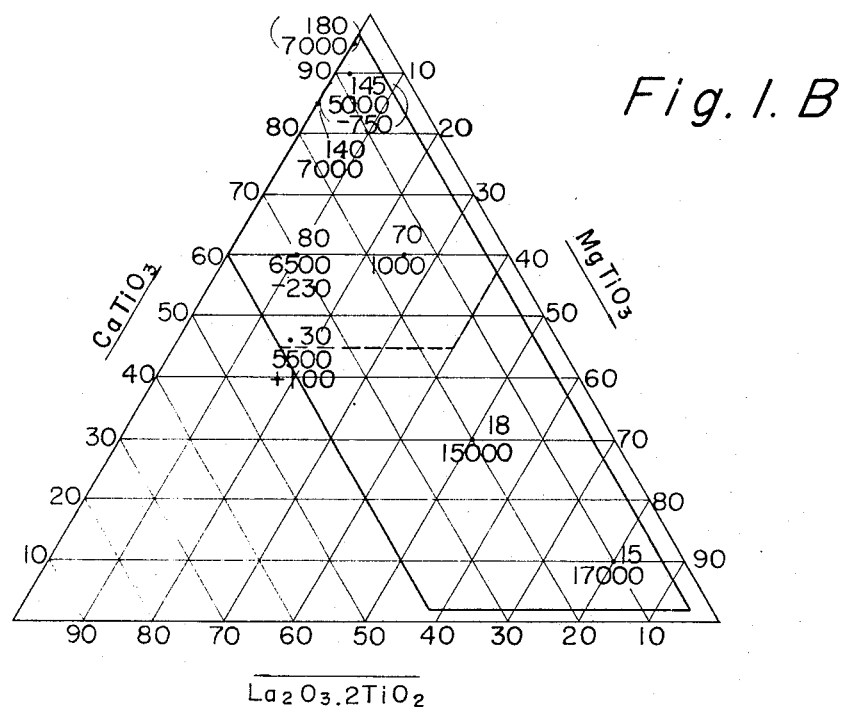
Fig. 1.B

3,431,124
CERAMIC DIELECTRIC
Shigekazu Hayashi, Setagaya-ku, Tokyo, and Sadao Kobayashi and Shinobu Fujiwara, Yuri-gun, Akita-ken, Japan, assignors to TDK Electronics Company, Limited, Tokyo, Japan, a corporation of Japan
Filed June 10, 1964, Ser. No. 373,949
U.S. Cl. 106—39                                2 Claims
Int. Cl. C04b 35/46

ABSTRACT OF THE DISCLOSURE

A dielectric having a high dielectric constant, a low temperature coefficient and loss coefficient, a high stability and a low deterioration rate consisting of a ceramic composed of 2 to 97 mol percent of $CaTiO_3$, 3 to 40 mol percent or $La_2O_3 \cdot 2TiO_2$ and 0 to 95 mol percent of $MgTiO_3$.

It is generally desirable that a ceramic dielectric should have a high dielectric constant, a low temperature coefficient and loss coefficient, a high stability and little deterioration with the lapse of years.

The dielectrics of comparatively favourable characteristics that has been conventionally used in practice are composed mostly of titanium oxide $TiO_2$, calcium titanate $CaTiO_3$, or magnesium titanate $MgTiO_3$. The dielectric constant of the dielectric composed mostly of $TiO_2$ or $CaTiO_3$ is 100 to 150. That of the one composed mostly of $MgTiO_3$ is 15 to 45. The composition $CaTiO_3$-$MgTiO_3$ has been known, but this has been able to give only characteristics which lie within the above mentioned range. Thus such dielectrics have respectively different ranges of dielectric constants. Therefore, it has been impossible to produce of the same system material a dielectric having a dielectric constant in a wide range. Thus the production process has been complicated and has resulted in a high cost. Further, in the conventional dielectric, no desired dielectric constant high enough can be obtained and therefore it is almost impossible to make the parts of electronic instrument smaller for the remarkable development of the electronic industry. The present invention has been suggested to eliminate the said defect.

A principal object of the present invention is to provide new ceramic dielectrics which have wide ranges of dielectric constants, can be made of the same system materials and are higher in dielectric constant and lower in loss coefficient than any conventional dielectrics.

Another object of the present invention is to provide new ceramic dielectrics which may have temperature coefficients in wide ranges, are high in dielectric constant and have very high Q-values.

FIGURE 1A is a ternary diagram of the dielectric compositions of the present invention.

FIGURE 1B shows the characteristics of the same dielectrics, that is to say, in FIGURE 1B, the values of the dielectric constants, Q and temperature coefficients of the respective points in FIGURE 1A are arranged in turn from above.

Figure 2:
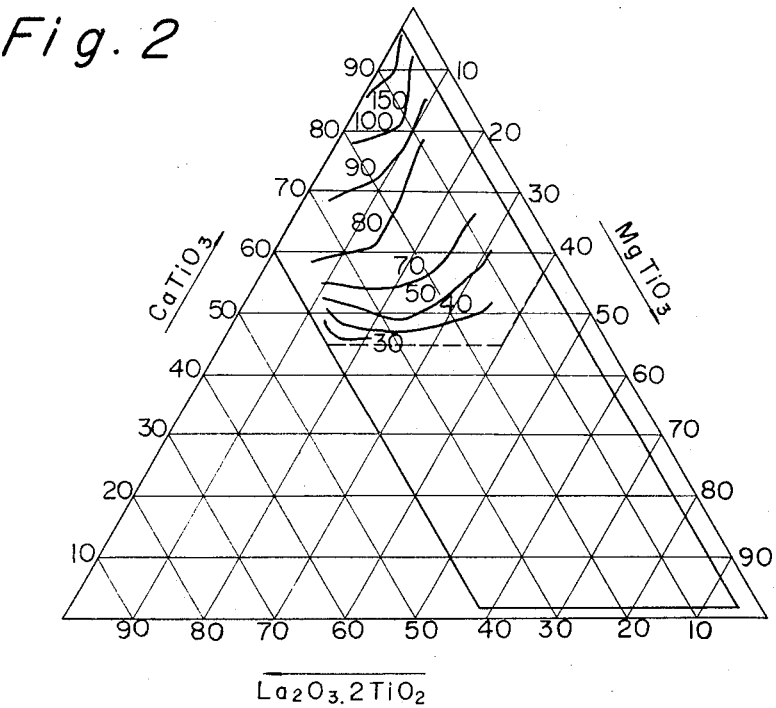
FIGURE 2 shows the dielectric constant of the product of the present invention.
Figure 3:
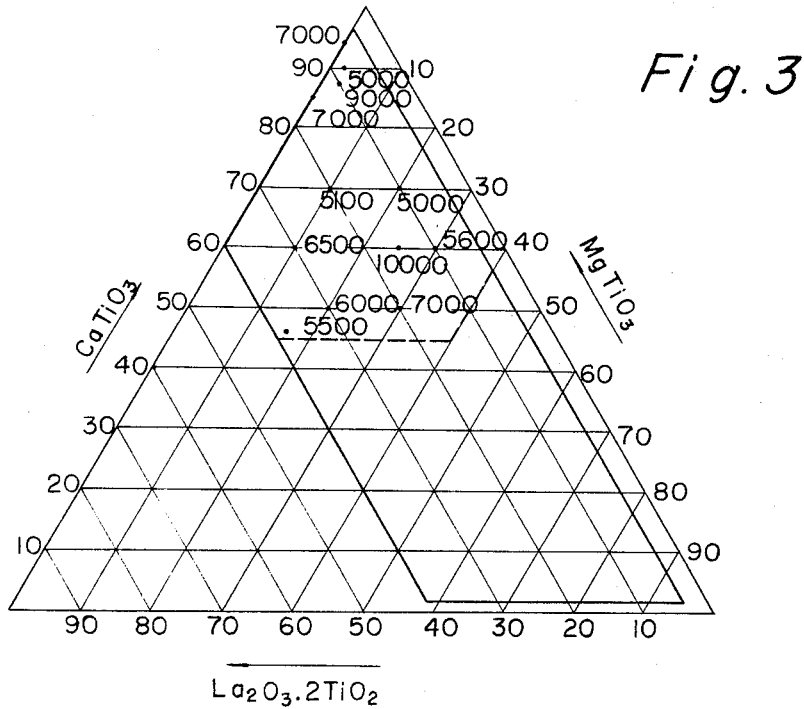
FIGURE 3 shows the values of Q of the same.
Figure 4:
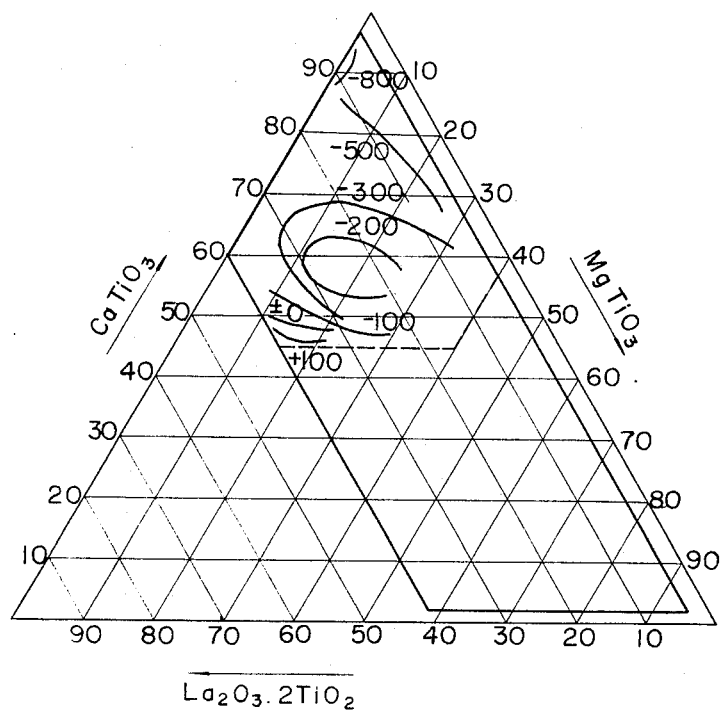
FIGURE 4 shows the temperature coefficients of the same dielectrics.

The present invention relates to a ceramic dielectric product of the materials composed of 2 to 97 mol percent $CaTiO_3$, 3 to 40 mol percent $La_2O_3 \cdot 2TiO_2$ and 0 to 95 mol percent $MgTiO_3$. The dielectric of the present invention has a dielectric constant of 15 to 180 and a Q-value of 5,000 to 20,000. As compared, for example, with the dielectric constant of 15 to 45 and the Q-value of 4,000 to 5,000 of a conventional dielectric composed mostly of $MgTiO_3$, the product of the present invention is found to be superior.

The most suitable composition to obtain the expected characteristics in the dielectric of the present invention is 2 to 97 mol percent $CaTiO_3$, 3 to 40 mol percent $La_2O_3 \cdot 2TiO_2$ and 0 to 95 mol percent $MgTiO_3$ in the range enclosed within the framework in FIGURE 1A, because, in case $CaTiO_3$ is less than 2 mol percent and $MgTiO_3$ is more than 95 mol percent, the value of the dielectric constant will be less than 15. When $CaTiO_3$ is more than 97 mol percent the ceramic sintering temperature will be so high as to be above 1,400° C. and, further when $La_2O_3 \cdot 2TiO_2$ is more than 40 mol percent, the value of Q will be less than 2,000 and, when it is less than 3 mol percent, the effect of the improvement showing the excellent features of the high dielectric constant and the low loss by the addition of $LaTiO_3 \cdot 2TiO_2$ will not be seen.

Examples of the present invention shall be described in the following.

Example 1

Titanium-dioxide $TiO_2$, calcium carbonate $CaCO_3$ and lanthanum oxide $La_2O_3$ were mixed together so as to be the composition 1 in FIGURE 1A i.e. a composition of 85 mol percent $CaTiO_3$ and 15 mol percent $La_2O_3 \cdot 2TiO_2$. The mixture was calcined at 1,230° C. for hours in an oxygen-containing atmosphere, was crushed to be a fine powder, was then moulded and was fired again. The dielectric produced by said process showed a dielectric constant of 140 and a Q-value of 7,000. The producing conditions in the following examples were the same as in this example.

Example 2

A ceramic dielectric produced by mixing the raw materials so as to be the composition 2 in FIGURE 1A i.e. a composition of 60 mol percent $CaTiO_3$, 15 mol percent $La_2O_3 \cdot 2TiO_2$ and 25 mol percent $MgTiO_3$ had a dielectric constant of 70 and a Q-value of 10,000.

Example 3

A ceramic dielectric produced by mixing the raw materials so as to be the composition 3 in FIGURE 1A i.e. a composition of 30 mol percent $CaTiO_3$, 20 mol percent $La_2O_3 \cdot 2TiO_2$ and 50 mol percent $MgTiO_3$ had a dielectric constant of 18 and a Q-value of 15,000.

Example 4

A ceramic dielectric produced by mixing the raw materials so as to be the composition 4 in FIGURE 1A i.e. a composition of 10 mol percent $CaTiO_3$, 10 mol percent $La_2O_3 \cdot 2TiO_2$ and 80 mol percent $MgTiO_3$ had a dielectric constant of 15 and a Q-value of 17,000.

Example 5

A ceramic dielectric produced by mixing the raw materials so as to be the composition 5 in FIGURE 1A i.e. a composition of 95 mol percent $CaTiO_3$ and 5 mol percent $La_2O_3 \cdot 2TiO_2$ had a dielectric constant of 180 and a Q-value of 7,000.

As in the above, ceramic dielectric consisting of 2 to 97 mol percent $CaTiO_3$, 3 to 40 mol percent $La_2O_3 \cdot 2TiO_2$ and 0 to 95 mol percent $MgTiO_3$ have dielectric constants in the range as 15 to 180 which is wider than that of any conventional dielectric and a very high Q-value.

Further if the compositions are selected so as to be in the ranges of 45 to 97 mol percent $CaTiO_3$, 3 to 40 mol percent $La_2O_3 \cdot 2TiO_2$ and 0 to 40 mol percent $MgTiO_3$, the dielectric constant and temperature coefficient can be made to be in the ranges 34 to 170 and +100 to $-750\times10^{-6}/°$ C., and Q and temperature coefficient can be freely controlled simultaneously.

Thus the present invention is recognized to be superior in view of the facts that a conventional dielectric composed mostly of $MgTiO_3$ has a temperature coefficient of $+100$ to $-750\times10^{-6}/°$ C. and a dielectric constant of 17 to 45, and that a dielectric composed mostly of $TiO_2$ has a temperature coefficient of $-750\times10^{-6}/°$ C. and a dielectric constant of 100.

Further examples shall be described in the following.

Example 6

A capacitor produced by mixing the raw materials so as to be a composition of 60 mol percent $CaTiO_3$, 30 mol percent $La_2O_3 \cdot 2TiO_2$ and 10 mol percent $MgTiO_3$ showed $\epsilon$ of 80, Q of 6,500 and a temperature coefficient of $-230\times10^{-6}/°$ C.

Example 7

A capacitor produced by mixing the raw materials so as to be a composition of 90 mol percent $CaTiO_3$, 8 mol percent $La_2O_3 \cdot 2TiO_2$ and 2 mol percent $MgTiO_3$ had values of $\epsilon$ of 145, Q of 5,000 and a temperature coefficient of $-750\times10^{-6}/°$ C.

Example 8

A capacitor produced by mixing the raw materials so as to be a composition of 46 mol percent $CaTiO_3$, 39 mol percent $La_2O_3 \cdot 2TiO_2$ and 16 mol percent $MgTiO_3$ had values of $\epsilon=30$, $Q=5,500$ and a temperature coefficient$=+100\times10^{-6}/°$ C.

As is evident from the said examples, the ceramic dielectric according to the present invention have a dielectric constant in the range 15 to 180 which is wider than of any conventional one and in addition to very high $\epsilon$- and Q-values, its temperature coefficient can be selected in a wider range. Therefore, according to the present invention, the trend to smaller products can be accelerated and dielectrics which are cheap as parts of radio, television and various communication instruments and has very excellent characteristics can be obtained.

What is claimed is:

1. A ceramic dielectric consisting essentially of 2 to 97 mol percent $CaTiO_3$, 3 to 40 mol percent $La_2O_3 \cdot 2TiO_2$ and 0 to 95 mol percent $MgTiO_3$.

2. The ceramic dielectric defined in claim 1, wherein the content of $CaTiO_3$ amounts to from 45 to 97 mol percent and the content of $MgTiO_3$ is 0 to 40 mol percent.

References Cited

UNITED STATES PATENTS

| 2,689,185 | 9/1954 | Soyck | 106—39 |
| 2,741,561 | 4/1956 | Das Gupta | 106—46 |
| 2,985,700 | 5/1961 | Johnston | 106—39 |
| 3,268,783 | 8/1966 | Saburi | 317—258 |

FOREIGN PATENTS

| 574,577 | 1/1946 | Great Britain. |

OTHER REFERENCES

Marzullo et al.: Dielectric Properties of Titania or Tin Oxide Containing Varying Proportions of Rare-Earth Oxides, J. Am. Cer. Soc., vol. 41, January 1958, pp. 40–41.

Mac Chesney et al.: The System $La_2O_3$-$TiO_2$; Phase Equilibria and Electrical Properties, vol. 45, September 1962, pp. 416–42.

HELEN M. McCARTHY, *Primary Examiner.*